(12) United States Patent
Shen et al.

(10) Patent No.: US 11,928,232 B1
(45) Date of Patent: Mar. 12, 2024

(54) PROTECTING SENSITIVE DATA FROM BEING EXPOSED IN GRAPH EMBEDDING VECTORS

(71) Applicant: NortonLifeLock Inc., Tempe, AZ (US)

(72) Inventors: Yun Shen, Bristol (GB); Yufei Han, Antibes (FR)

(73) Assignee: GEN DIGITAL INC., Tempe, AZ (US)

(*) Notice: Subject to any disclaimer, the term of this patent is extended or adjusted under 35 U.S.C. 154(b) by 493 days.

(21) Appl. No.: 17/191,467

(22) Filed: Mar. 3, 2021

(51) Int. Cl.
*G06F 21/00* (2013.01)
*G06F 16/901* (2019.01)
*G06F 21/62* (2013.01)
*G06N 3/088* (2023.01)

(52) U.S. Cl.
CPC ...... *G06F 21/6227* (2013.01); *G06F 16/9024* (2019.01); *G06N 3/088* (2013.01)

(58) Field of Classification Search
CPC .. G06F 21/6227; G06F 16/9024; G06N 3/088
See application file for complete search history.

(56) References Cited

U.S. PATENT DOCUMENTS

2020/0356858 A1* 11/2020 Hegde ................... G06N 3/047
2021/0019558 A1* 1/2021 Edge .................... G06F 16/285

OTHER PUBLICATIONS

Houle et al.("Improving the Quality of K-NN Graphs for Image Databases through Vector Sparsification", ICMR '14: Proceedings of International Conference on Multimedia Retrieval, Apr. 2014, pp. 89-96) (Year: 2014).*
Martin Abadi, Andy Chu, Ian Goodfellow, H.Brendan McMahan, Ilya Mironov, Kunal Talwar, and Li Zhang. Deep learning with differential privacy. In ACM CCS, 2016.
Jemal H Abawajy, Mohd Izuan Hafez Ninggal, and Tutut Herawan. Privacy preserving social network data publication. IEEE communications surveys & tutorials, 18(3), 2016.
Mikkel Abrahamsen, Greg Bodwin, Eva Rotenberg, and Morten Stöckel. Graph reconstruction with a betweenness oracle. In STACS, 2016.
Naman Agarwal and Karan Singh. The price of differential privacy for online learning. In ICML, 2017.
Mohammad Al Hasan, Vineet Chaoji, Saeed Salem, and Mohammed Zaki. Link prediction using supervised learning. In SDM, 2006.

(Continued)

*Primary Examiner* — Michael M Lee
(74) *Attorney, Agent, or Firm* — MASCHOFF BRENNAN

(57) ABSTRACT

A method for protecting sensitive data from being exposed in graph embedding vectors. In some embodiments, a method may include generating first graph embedding vectors from an original graph and generating a proxy graph from the first graph embedding vectors. The proxy graph may include a plurality of proxy nodes and proxy edges connecting the proxy nodes. The proxy nodes may include one or more attributes of the original nodes that are included in the first graph embedding vectors. Second graph embedding vectors may then be generated by encoding the proxy graph and a reconstructed graph may be generated from the second graph embedding vectors. Finally, the reconstructed graph may be compared to the original graph and if a threshold level of similarity is met, a security action may be performed to protect sensitive data from being exposed.

17 Claims, 4 Drawing Sheets

(56) References Cited

OTHER PUBLICATIONS

David Aldous and James Allen Fill. Reversible markov chains and random walks on graphs, 2002. Unfinished monograph, recompiled 2014, available at http://www.stat.berkeley.edu/$\sim$aldous/RWG/book.html.
Seyed Ali Alhosseini, Raad Bin Tareaf, Pejman Najafi, and Christoph Meinel. Detect me if you can: Spam bot detection using inductive representation learning. In WWW, 2019.
Dana Angluin and Jiang Chen. Learning a hidden graph using o (logn) queries per edge. Journal of Computer and System Sciences, 74(4), 2008.
Lars Backstrom, Cynthia Dwork, and Jon Kleinberg. Wherefore art thou r3579x? anonymized social networks, hidden patterns, and structural steganography. In WWW, 2007.
Zuzana Beerliova, Felix Eberhard, Thomas Erlebach, Alexander Hall, Michael Hoffmann, Mat Mihal'ak, and L Shankar Ram. Network discovery and verification. IEEE Journal on selected areas in communications, 24(12), 2006.
Ghazaleh Beigi and Huan Liu. A survey on privacy in social media: Identification, mitigation, and applications. ACM Transactions on Data Science, 1(1), 2020.
J Adrian Bondy and Robert L Hemminger. Graph reconstruction-a survey. Journal of Graph Theory, 1(3), 1977.
Mathilde Bouvel, Vladimir Grebinski, and Gregory Kucherov. Combinatorial search on graphs motivated by bioinformatics applications: A brief survey. In WG, 2005.
Ulrik Brandes, Marco Gaertler, and Dorothea Wagner. Experiments on graph clustering algorithms. In European Symposium on Algorithms, 2003.
Ronald L Breiger and Philippa E Pattison. Cumulated social roles: The duality of persons and their algebras. Social networks, 8(3), 1986.
Maria R Brito, Edgar L Chávez, Adolfo J Quiroz, and Joseph E Yukich. Connectivity of the mutual knearest-neighbor graph in clustering and outlier detection. Statistics & Probability Letters, 35(1), 1997.
MichaelMBronstein, Joan Bruna, Yann LeCun, Arthur Szlam, and Pierre Vandergheynst. Geometric deep learning: going beyond euclidean data. IEEE Signal Processing Magazine, 34(4), 2017.
Hongyun Cai, Vincent W Zheng, and Kevin Chen-Chuan Chang. A comprehensive survey of graph embedding: Problems, techniques, and applications. IEEE Transactions on Knowledge and Data Engineering, 30(9), 2018.
Nicholas Carlini, Chang Liu, Ulfar Erlingsson, Jernej Kos, and Dawn Song. The Secret Sharer: Evaluating and Testing Unintended Memorization in Neural Networks. In USENIX Security, 2019.
Hal Caswell. Sensitivity analysis of discrete markov chains via matrix calculus. Linear Algebra and its Applications, 438(4): 1727-1745, 2013.
K. Chaudhuri and C. Monteleoni. Privacy-preserving logistic regression. In NIPS, 2008.
Kamalika Chaudhuri, Claire Monteleoni, and Anand D. Sarwate. Differentially private empirical risk minimization. JMLR, 2011.
Kamalika Chaudhuri, Anand D. Sarwate, and Kaushik Sinha. A near-optimal algorithm for differentially-private principal components. J. Mach. Learn. Res., 14(1), 2013.
Dan Chen, Dan-Dan Shi, Mi Qin, Si-Meng Xu, and Gui-Jun Pan. Complex network comparison based on communicability sequence entropy. Physical Review E, 98(1), 2018.
Min Chen, Zhikun Zhang, Tianhao Wang, Michael Backes, Mathias Humbert, and Yang Zhang. When Machine Unlearning Jeopardizes Privacy. CoRR abs/2005.02205, 2020.
Yizheng Chen, ShiqiWang, Dongdong She, and Suman Jana. On Training Robust PDF Malware Classifiers. In USENIX Security, 2020.
Aaron Clauset, Cristopher Moore, and Mark EJ Newman. Hierarchical structure and the prediction of missing links in networks. Nature, 2008.

Adriano Di Luzio, Alessandro Mei, and Julinda Stefa. Mind your probes: De-anonymization of large crowds through smartphone wifi probe requests. In INFOCOM. IEEE, 2016.
Claire Donnat, Susan Holmes, et al. Tracking network dynamics: A survey using graph distances. The Annals of Applied Statistics, 12(2), 2018.
Vasisht Duddu, Antoine Boutet, and Virat Shejwalkar. Quantifying privacy leakage in graph embedding. arXiv preprint arXiv: 1912.10979, 2020.
Daniel M Dunlavy, Tamara G Kolda, and Evrim Acar. Temporal link prediction using matrix and tensor factorizations. TKDD, 5(2), 2011.
Cynthia Dwork and Aaron Roth. The algorithmic foundations of differential privacy. Found. Trends Theor. Comput. Sci., 2014.
Michael Ellers, Michael Cochez, Tobias Schumacher, Markus Strohmaier, and Florian Lemmerich. Privacy attacks on network embeddings. arXiv preprint arXiv:1912.10979, 2019.
Francisco Escolano and Edwin R Hancock. From points to nodes: Inverse graph embedding through a lagrangian formulation. In International Conference on Computer Analysis of Images and Patterns, pp. 194-201, 2011.
Ernesto Estrada and Naomichi Hatano. Communicability in complex networks. Physical Review E, 77(3), 2008.
Ming Fan, Xiapu Luo, Jun Liu, Meng Wang, Chunyin Nong, Qinghua Zheng, and Ting Liu. Graph embedding based familial analysis of android malware using unsupervised learning. In ICSE, 2019.
Michael Fire and Rami Puzis. Organization mining using online social networks. Networks and Spatial Economics, 16(2), 2016.
Santo Fortunato. Community detection in graphs. Physics reports, 486(3-5), 2010.
Matt Fredrikson, Somesh Jha, and Thomas Ristenpart. Model inversion attacks that exploit confidence information and basic countermeasures. In ACM CCS, 2015.
Matt Fredrikson, Eric Lantz, Somesh Jha, Simon Lin, David Page, and Thomas Ristenpart. Privacy in Pharmacogenetics: An End-to-End Case Study of Personalized Warfarin Dosing. In USENIX Security, 2014.
Arik Friedman and Assaf Schuster. Data mining with differential privacy. In KDD, 2010.
Hongchang Gao and Heng Huang. Deep attributed network embedding. In IJCAI, 2018.
Jian Gao, Xin Yang, Ying Fu, Yu Jiang, and Jiaguang Sun. Vulseeker: a semantic learning based vulnerability seeker for cross-platform binary. In ASE, 2018.
Xinbo Gao, Bing Xiao, Dacheng Tao, and Xuelong Li. A survey of graph edit distance. Pattern Analysis and applications, 13(1), 2010.
Thomas Gärtner, Peter Flach, and Stefan Wrobel. On graph kernels: Hardness results and efficient alternatives. In Learning theory and kernel machines. Springer, 2003.
Hugo Gascon, Fabian Yamaguchi, Daniel Arp, and Konrad Rieck. Structural detection of android malware using embedded call graphs. In AISec, 2013.
Lise Getoor and Christopher P Diehl. Link mining: a survey. ACM KDD Explorations Newsletter, 7(2), 2005.
Palash Goyal and Emilio Ferrara. Graph embedding techniques, applications, and performance: A survey. Knowledge-Based Systems, 151, 2018.
Aditya Grover and Jure Leskovec. node2vec: Scalable feature learning for networks. In KDD, 2016.
Roger Guimera, Leon Danon, Albert Diaz-Guilera, Francesc Giralt, and Alex Arenas. Self-similar community structure in a network of human interactions. Physical review E, 68(6), 2003.
Roger Guimeràand Marta Sales-Pardo. Missing and spurious interactions and the reconstruction of complex networks. PNAS, 2009.
Gábor György Gulyas and Sandor Imre. Measuring importance of seeding for structural de-anonymization attacks in social networks. In Percom Workshops, 2014.
Trevor Hastie, Robert Tibshirani, and Jerome Friedman. The elements of statistical learning: data mining, inference, and prediction. Springer Science & Business Media, 2009.

(56) References Cited

OTHER PUBLICATIONS

Xinlei He, Jinyuan Jia, Michael Backes, Neil Zhenqiang Gong, and Yang Zhang. Stealing Links from Graph Neural Networks. In USENIX Security, 2021.

Danny Hermelin, Avivit Levy, Oren Weimann, and Raphael Yuster. Distance oracles for vertex-labeled graphs. In ICALP, 2011.

Jeremy Hoskins, Cameron Musco, Christopher Musco, and Babis Tsourakakis. Inferring networks from random walk-based node similarities. In NIPS, 2018.

Darko Hric, Tiago P Peixoto, and Santo Fortunato. Network structure, metadata, and the prediction of missing nodes and annotations. Physical Review X, 2016.

Xiao Huang, Jundong Li, and Xia Hu. Accelerated attributed network embedding. In ICDM, 2017.

Xiao Huang, Jundong Li, and Xia Hu. Label informed attributed network embedding. In ICWSDM, 2017.

Matthew Jagielski, Nicholas Carlini, David Berthelot, Alex Kurakin, and Nicolas Papernot. High Accuracy and High Fidelity Extraction of Neural Networks. In USENIX Security, 2020.

Anil K Jain. Data clustering: 50 years beyond k-means. Pattern recognition letters, 31(8), 2010.

Prateek Jain and Abhradeep Thakurta. Differentially private learning with kernels. In ICML, 2013.

Shaoxiong Ji, Shirui Pan, Erik Cambria, Pekka Marttinen, and Philip S Yu. A survey on knowledge graphs: Representation, acquisition and applications. arXiv preprint arXiv:2002.00388, 2020.

Shouling Ji, Weiqing Li, Prateek Mittal, Xin Hu, and Raheem Beyah. Secgraph: A uniform and open-source evaluation system for graph data anonymization and de-anonymization. In USENIX Security, 2015.

Shouling Ji, Weiqing Li, Mudhakar Srivatsa, and Raheem Beyah. Structural data de-anonymization: Quantification, practice, and implications. In ACM CCS, 2014.

Shouling Ji, Weiqing Li, Mudhakar Srivatsa, Jing Selena He, and Raheem Beyah. Structure based data deanonymization of social networks and mobility traces. In ICIS, 2014.

Shouling Ji, Weiqing Li, Shukun Yang, Prateek Mittal, and Raheem Beyah. On the relative de- anonymizability of graph data: Quantification and evaluation. In INFOCOM, 2016.

Shouling Ji, Prateek Mittal, and Raheem Beyah. Graph data anonymization, de-anonymization attacks, and deanonymizability quantification: A survey. IEEE Communications Surveys & Tutorials, 19(2), 2016.

Wuxuan Jiang, Cong Xie, and Zhihua Zhang. Wishart mechanism for differentially private principal components analysis. In AAAI, 2016.

Sampath Kannan, Claire Mathieu, and Hang Zhou. Near-linear query complexity for graph inference. In ICALP, 2015.

Hisashi Kashima and Akihiro Inokuchi. Kernels for graph classification. In ICDM workshop on active mining, 2002.

Myunghwan Kim and Jure Leskovec. The network completion problem: Inferring missing nodes and edges in networks. In ICDM, 2011.

Valerie King, Li Zhang, and Yunhong Zhou. On the complexity of distance-based evolutionary tree reconstruction. In SODA, 2003.

Thomas N Kipf and Max Welling. Semi-supervised classification with graph convolutional networks. arXiv preprint arXiv:1609.02907, 2016.

Thomas N Kipf and Max Welling. Variational graph auto-encoders. arXiv preprint arXiv:1611.07308, 2016.

Aleksandra Korolova, Rajeev Motwani, Shubha U Nabar, and Ying Xu. Link privacy in social networks. In CIKM, 2008.

Nitish Korula and Silvio Lattanzi. An efficient reconciliation algorithm for social networks. VLDB, 2014.

Mark A Kramer. Nonlinear principal component analysis using autoassociative neural networks. AIChE journal, 37(2), 1991.

Andrea Lancichinetti and Santo Fortunato. Community detection algorithms: a comparative analysis. Physical review E, 80(5), 2009.

Andrea Lancichinetti, Santo Fortunato, and Filippo Radicchi. Benchmark graphs for testing community detection algorithms. Physical review E, 78(4), 2008.

Klas Leino and Matt Fredrikson. Stolen Memories: Leveraging Model Memorization for Calibrated White- Box Membership Inference. In USENIX Security, 2020.

Jure Leskovec and Julian J Mcauley. Learning to discover social circles in ego networks. In NIPS, 2012.

Chencheng Li, Pan Zhou, Xiong Li, Qian Wang, and Ting Wang. Differentially private distributed online learning. TKDE, 2018.

Jundong Li, Liang Wu, Ruocheng Guo, Chenghao Liu, and Huan Liu. Multi-level network embedding with boosted low-rank matrix approximation. In ASONAM, 2019.

Kaiyang Li, Guangchun Luo, Yang Ye, Wei Li, Shihao Ji, and Zhipeng Cai. Adversarial privacy preserving graph embedding against inference attack. arXiv preprint arXiv:2008.13072, 2020.

Zheng Li, Chengyu Hu, Yang Zhang, and Shanqing Guo. How to Prove Your Model Belongs to You: A Blind-Watermark based Framework to Protect Intellectual Property of DNN. In ACSAC, 2019.

David Liben-Nowell and Jon Kleinberg. The link-prediction problem for social networks. JAIST, 58(7):1019-1031, 2007.

Katrina Ligett, Seth Neel, Aaron Roth, Bo Waggoner, and Zhiwei Steven Wu. Accuracy first: Selecting a differential privacy level for accuracy-constrained erm. In NIPS, 2017.

Jianhua Lin. Divergence measures based on the Shannon entropy. IEEE Transactions on Information theory, 37(1), 1991.

Bingchang Liu, Wei Huo, Chao Zhang, Wenchao Li, Feng Li, Aihua Piao, andWei Zou. adiff: cross-version binary code similarity detection with dnn. In ASE, 2018.

Fucheng Liu, Yu Wen, Dongxue Zhang, Xihe Jiang, Xinyu Xing, and Dan Meng. Log2vec: A heterogeneous graph embedding based approach for detecting cyber threats within enterprise. In Acm CCS, 2019.

Kun Liu and Evimaria Terzi. Towards identity anonymization on graphs. In Proceedings of the 2008 ACM SIGMOD International Conference on Management of Data, SIGMOD '08, p. 93-106, 2008.

Xin Liu, Chenyi Zhuang, Tsuyoshi Murata, Kyoung-Sook Kim, and Natthawut Kertkeidkachorn. How much topological structure is preserved by graph embeddings? Computer Science and Information Systems, 16(2), 2019.

Linyuan Lu and Tao Zhou. Link prediction in complex networks: A survey. Physica A, 390(6), 2011.

Laurens van der Maaten and Geoffrey Hinton. Visualizing data using t-sne. Journal of machine learning research, 9, 2008.

Markus Maier, Matthias Hein, and Ulrike Von Luxburg. Optimal construction of k-nearest-neighbor graphs for identifying noisy clusters. Theoretical Computer Science, 2009.

Fragkiskos D Malliaros and Michalis Vazirgiannis. Clustering and community detection in directed networks: A survey. Physics reports, 533(4), 2013.

Denis Mazur, Vage Egiazarian, Stanislav Morozov, and Artem Babenko. Beyond vector spaces: Compact data representation as differentiable weighted graphs. In NIPS, 2019.

Leland McInnes, John Healy, and Steve Astels. hdb-scan: Hierarchical density based clustering. Journal of Open Source Software, 2(11), 2017.

Leland McInnes, John Healy, and James Melville. Umap: Uniform manifold approximation and projection for dimension reduction. arXiv preprint arXiv:1802.03426, 2018.

F. Mcsherry and K. Talwar. Mechanism design via differential privacy. In FOCS, 2007.

Luca Melis, Congzheng Song, Emiliano De Cristofaro, and Vitaly Shmatikov. Exploiting Unintended Feature Leakage in Collaborative Learning. In IEEE S&P, 2019.

Aditya Krishna Menon and Charles Elkan. Link prediction via matrix factorization. In ECML/PAKDD, 2011.

Annamalai Narayanan, Mahinthan Chandramohan, Rajasekar Venkatesan, Lihui Chen, Yang Liu, and Shantanu Jaiswal. graph2vec: Learning distributed representations of graphs. arXiv preprint arXiv:1707.05005, 2017.

(56) References Cited

OTHER PUBLICATIONS

Arvind Narayanan, Elaine Shi, and Benjamin IP Rubinstein. Link prediction by de-anonymization: How we won the kaggle social network challenge. In IJCNN, 2011.

Arvind Narayanan and Vitaly Shmatikov. Deanonymizing social networks. In IEEE S&P, 2009.

Milad Nasr, Reza Shokri, and Amir Houmansadr. Comprehensive Privacy Analysis of Deep Learning: Passive and Active White-box Inference Attacks against Centralized and Federated Learning. In IEEE S&P, 2019.

Shirin Nilizadeh, Apu Kapadia, and Yong-Yeol Ahn. Community-enhanced de-anonymization of online social networks. In ACM CCS, 2014.

Nicolas Papernot, Patrick McDaniel, Arunesh Sinha, and Michael Wellman. Sok: Towards the Science of Security and Privacy in Machine Learning. In Euro S&P, 2018.

Pedram Pedarsani, Daniel R Figueiredo, and Matthias Grossglauser. A bayesian method for matching two similar graphs without seeds. In Allerton Conference on Communication, Control, and Computing (Allerton), 2013.

Abdurrahman Pekta, s and Tankut Acarman. Deep learning for effective android malware detection using api call graph embeddings. Soft Computing, 24(2), 2020.

Bryan Perozzi, Rami Al-Rfou, and Steven Skiena. Deepwalk: Online learning of social representations. In KDD, 2014.

Vu Viet Hoang Pham, Shui Yu, Keshav Sood, and Lei Cui. Privacy issues in social networks and analysis: a comprehensive survey. IET networks, 7(2), 2017.

Jianwei Qian, Xiang-Yang Li, Chunhong Zhang, and Linlin Chen. De-anonymizing social networks and inferring private attributes using knowledge graphs. In INFOCOM, 2016.

Zhan Qin, Ting Yu, Yin Yang, Issa Khalil, Xiaokui Xiao, and Kui Ren. Generating synthetic decentralized social graphs with local differential privacy. In ACM CCS, 2017.

Jiezhong Qiu, Yuxiao Dong, Hao Ma, Jian Li, Kuansan Wang, and Jie Tang. Network embedding as matrix factorization: Unifying deepwalk, line, pte, and node2vec. In WSDM, 2018.

Erwin Quiring, Alwin Maier, and Konrad Rieck. Misleading Authorship Attribution of Source Code using Adversarial Learning. In USENIX Security, 2019.

Benedek Rozemberczki and Rik Sarkar. Characteristic functions on graphs: Birds of a feather, from statistical descriptors to parametric models. In CIKM, 2020.

Benjamin I.P. Rubinstein, Peter L. Bartlett, Ling Huang, and Nina Taft. Learning in a large function space: Privacy-preserving mechanisms for svm learning. Journal of Privacy and Confidentiality, 2012.

Ahmed Salem, Yang Zhang, Mathias Humbert, Pascal Berrang, Mario Fritz, and Michael Backes. ML-Leaks: Model and Data Independent Membership Inference Attacks and Defenses on Machine Learning Models. In NDSS, 2019.

Guillaume Salha, Romain Hennequin, Jean-Baptiste Remy, Manuel Moussallam, and Michalis Vazirgiannis. Fastgae: Fast, scalable and effective graph autoencoders with stochastic subgraph decoding. arXiv preprint arXiv:2002.01910, 2020.

Satu Elisa Schaeffer. Graph clustering. Computer science review, 1(1), 2007.

Tiago A Schieber, Laura Carpi, Albert Diaz-Guilera, Panos M Pardalos, Cristina Masoller, and Martin G Ravetti. Quantification of network structural dissimilarities. Nature communications, 8(1), 2017.

Ali Shafahi, W Ronny Huang, Mahyar Najibi, Octavian Suciu, Christoph Studer, Tudor Dumitras, and Tom Goldstein. Poison Frogs! Targeted Clean-Label Poisoning Attacks on Neural Networks. In NIPS, 2018.

Sohil Atul Shah and Vladlen Koltun. Robust continuous clustering. PNAS, 2017.

Kumar Sharad and George Danezis. De-anonymizing d4d datasets. In Workshop on hot topics in privacy enhancing technologies, 2013.

Yutaka Shimada, Yoshito Hirata, Tohru Ikeguchi, and Kazuyuki Aihara. Graph distance for complex networks. Scientific reports, 6, 2016.

Reza Shokri, Marco Stronati, Congzheng Song, and Vitaly Shmatikov. Membership inference attacks against machine learning models. In IEEE S&P, 2017.

Sigal Sina, Avi Rosenfeld, and Sarit Kraus. Solving the missing node problem using structure and attribute information. In ASONAM, 2013.

Mudhakar Srivatsa and Mike Hicks. Deanonymizing mobility traces: Using social network as a side- channel. In ACM CCS, 2012.

Dong Su, Jianneng Cao, Ninghui Li, Elisa Bertino, Min Lyu, and Hongxia Jin. Differentially private k-means clustering and a hybrid approach to private optimization. ACM Trans. Priv. Secur., 2017.

Jian Tang, Jingzhou Liu, Ming Zhang, and Qiaozhu Mei. Visualizing large-scale and high-dimensional data. In WWW, 2016.

Jian Tang, Meng Qu, and Qiaozhu Mei. Pte: Predictive text embedding through large-scale heterogeneous text networks. In KDD, 2015.

Jian Tang, Meng Qu, MingzheWang, Ming Zhang, Jun Yan, and Qiaozhu Mei. Line: Large-scale information network embedding. In WWW, 2015.

Fei Tian, Bin Gao, Qing Cui, Enhong Chen, and Tie-Yan Liu. Learning deep representations for graph clustering. In AAAI, 2014.

Florian Tramér, Fan Zhang, Ari Juels, Michael K Reiter, and Thomas Ristenpart. Stealing machine learning models via prediction apis. In USENIX Security, 2016.

Cong Tran, Won-Yong Shin, Andreas Spitz, and Michael Gertz. Deepnc: Deep generative network completion. arXiv preprint arXiv:1907.07381, 2019.

Théo Trouillon, JohannesWelbl, Sebastian Riedel, Éric Gaussier, and Guillaume Bouchard. Complex embeddings for simple link prediction. In ICML, 2016.

Anton Tsitsulin, Davide Mottin, Panagiotis Karras, Alexander Bronstein, and Emmanuel Müller. Netlsd: hearing the shape of a graph. In KDD, 2018.

Kun Tu, Jian Li, Don Towsley, Dave Braines, and Liam D Turner. gl2vec: Learning feature representation using graphlets for directed networks. In ASONAM, 2019.

Saurabh Verma and Zhi-Li Zhang. Hunt for the unique, stable, sparse and fast feature learning on graphs. In NIPS, 2017.

Binghui Wang, Jinyuan Jia, and Neil Zhenqiang Gong. Graph-based security and privacy analytics via collective classification with joint weight learning and propagation. In NDSS, 2019.

Di Wang, Changyou Chen, and Jinhui Xu. Differentially private empirical risk minimization with nonconvex loss functions. In ICML, 2019.

Jianyu Wang, Rui Wen, Chunming Wu, Yu Huang, and Jian Xion. Fdgars: Fraudster detection via graph convolutional networks in online app review system. In WWW, 2019.

Peng Wang, BaoWen Xu, YuRong Wu, and XiaoYu Zhou. Link prediction in social networks: the stateof-the-art. Science China Information Sciences, 58(1), 2015.

Quan Wang, Zhendong Mao, Bin Wang, and Li Guo. Knowledge graph embedding: A survey of approaches and applications. TKDE, 29(12), 2017.

Yining Wang, Yu-Xiang Wang, and Aarti Singh. Differentially private subspace clustering. In NIPS, 2015.

Peter Wills and François G Meyer. Metrics for graph comparison: A practitioner's guide. Plos one, 15(2), 2020.

Richard C Wilson and Ping Zhu. A study of graph spectra for comparing graphs and trees. Pattern Recognition, 41(9), 2008.

Gilbert Wondracek, Thorsten Holz, Engin Kirda, and Christopher Kruegel. A practical attack to deanonymize social network users. In IEEE S&P, 2010.

Huijun Wu, Chen Wang, Yuriy Tyshetskiy, Andrew Docherty, Kai Lu, and Liming Zhu. Adversarial Examples for Graph Data: Deep Insights into Attack and Defense. In IJCAI, 2019.

Zonghan Wu, Shirui Pan, Fengwen Chen, Guodong Long, Chengqi Zhang, and S Yu Philip. A comprehensive survey on graph neural networks. IEEE Transactions on Neural Networks and Learning Systems, 2020.

(56) References Cited

OTHER PUBLICATIONS

Xiaojun Xu, Chang Liu, Qian Feng, Heng Yin, Le Song, and Dawn Song. Neural network-based graph embedding for cross-platform binary code similarity detection. In ACM CCS, 2017.

Daokun Zhang, Jie Yin, Xingquan Zhu, and Chengqi Zhang. Network representation learning: A survey. IEEE transactions on Big Data, 2018.

Muhan Zhang and Yixin Chen. Link prediction based on graph neural networks. In NIPS, 2018.

Shichao Zhang, Xuelong Li, Ming Zong, Xiaofeng Zhu, and Debo Cheng. Learning k for knn classification. ACM Transactions on Intelligent Systems and Technology, 2017.

Vasisht Duddu, Antoine Doutet, and Virat Shejwalker. Quantifying Privacy Leakage in Graph Embedding. arXiv:2010.00906v1. Oct. 2, 2020.

* cited by examiner

PROTECTING SENSITIVE DATA FROM BEING EXPOSED IN GRAPH EMBEDDING VECTORS

BACKGROUND

Graphs, such as social networks and communication networks, appear in a wide variety of real-world domains. These graphs may contain a massive amount of data, including proprietary and/or confidential information. Because of their non-Euclidean nature, graphs do not present familiar features that are common to other systems. This makes dealing with graph data challenging. Graph embedding algorithms are sometimes used to convert graphs into low dimensional vectors. After a graph is converted into low dimensional vectors, graph analytic tasks may be performed, and graph information may be presented in a more readable format. Often, these graph analytic tasks are outsourced to third parties. Indeed, a variety of entities provide services that allow graph embedding vectors to be uploaded, visualized, and explored.

There exist, however, potential security risks in sharing graph embedding vectors. This is because structural information about the graph may be implicitly preserved in the graph embedding vectors. This information may be used to reconstruct the original graph, thereby revealing proprietary and/or confidential information that is contained within the graph. For example, in the context of a social network, a reconstructed graph may disclose the existence of sensitive social relationships. Graph data may also include information that was acquired at great expensive or difficulty. Maintaining exclusive ownership and control over this information may be of critical importance. In addition, graph reconstruction can serve as a stepping-stone for more advanced subsequent attacks. In light of these potential security risks, some evaluation of graph embedding vectors should be undertaken before these vectors are shared with any third parties.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for protecting sensitive data from being exposed in graph embedding vectors is disclosed. At least a portion of the method may be performed by a computing device comprising one or more processors. The computer-implemented method may include identifying sensitive data and creating an original graph from the sensitive data. The original graph may include a plurality of original nodes and original edges connecting the original nodes. The computer-implemented method may also include generating first graph embedding vectors from the original graph. The first graph embedding vectors may include one or more attributes of the original nodes. The computer-implemented method may further include generating from the first graph embedding vectors a proxy graph. The proxy graph may include a plurality of proxy nodes and proxy edges connecting the proxy nodes. The proxy nodes may include the one or more attributes of the original nodes that are included in the first graph embedding vectors. In addition, the computer-implemented method may include generating second graph embedding vectors by encoding the proxy graph and generating a reconstructed graph by decoding the second graph embedding vectors. Finally, the computer-implemented method may include comparing the reconstructed graph to the original graph to determine whether a threshold level of similarity is met. If this threshold level of similarity is met, a security action may be performed to protect the sensitive data from being exposed in the first graph embedding vectors.

In some embodiments, the first graph embedding vectors may be generated by applying a graph embedding algorithm to the original graph.

In some embodiments, the proxy graph may be generated by using a mutual k-NN graph construction technique.

In some embodiments, the generating of the second graph embedding vectors may comprise using a graph autoencoder. In these embodiments, graph autoencoder may comprise an unsupervised machine learning algorithm.

In some embodiments, the performing of the security action may comprise preventing the first graph embedding vectors from being exposed to a third-party.

In some embodiments, the performing of the security action may comprise injecting the first graph embedding vectors with random noise prior to sharing the first graph embedding vectors with a third-party.

In another embodiment, one or more non-transitory computer-readable media may include one or more computer-readable instructions that, when executed by one or more security servers, cause the one or more security servers to perform a method for protecting sensitive data from being exposed in graph embedding vectors.

In some embodiments, a computing device may include one or more processors and one or more non-transitory computer-readable media comprising one or more computer-readable instructions that, when executed by the one or more processors, cause the computing device to perform a method for protecting sensitive data from being exposed in graph embedding vectors.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
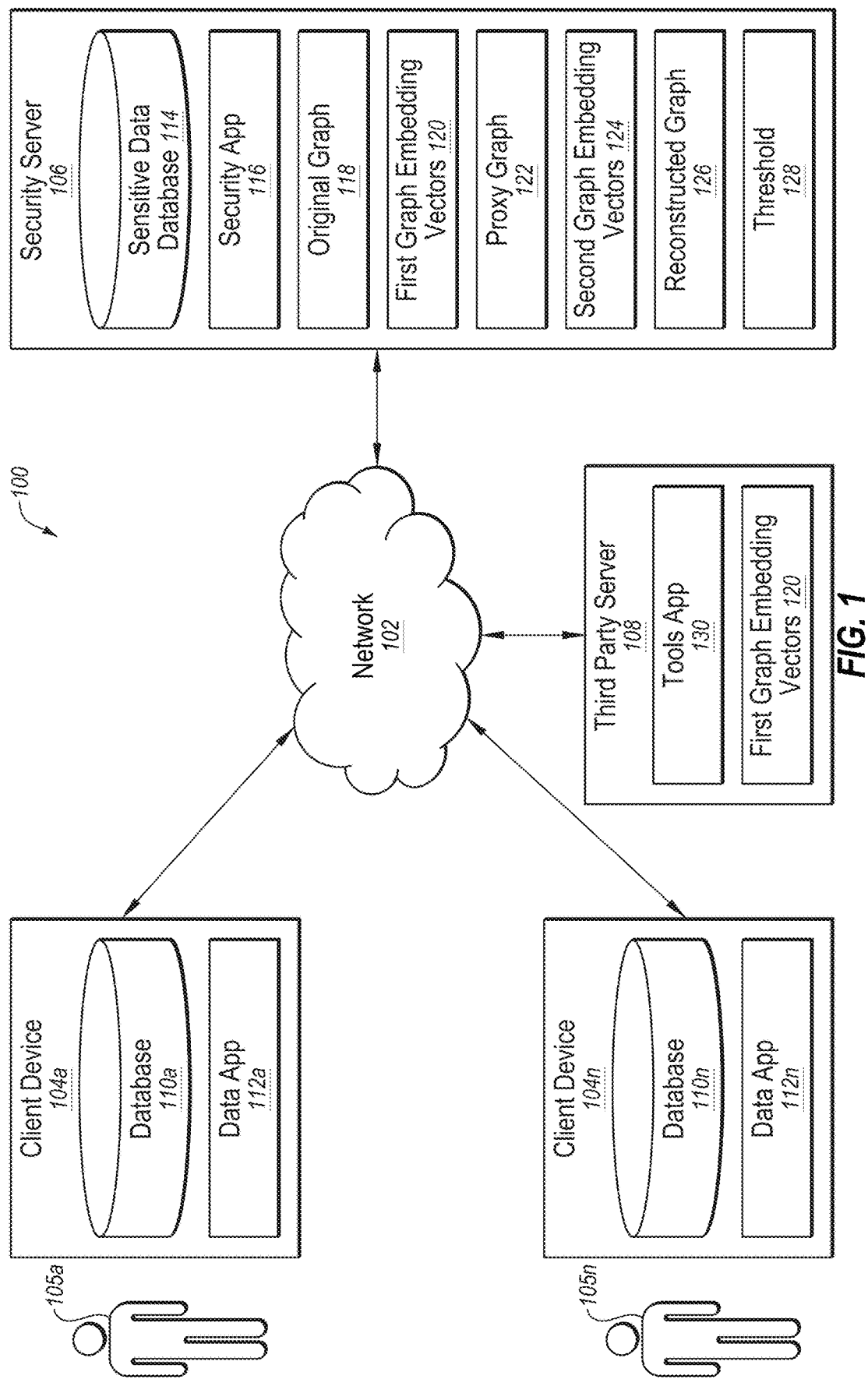
FIG. 1 illustrates an example system configured for protecting sensitive data from being exposed in graph embedding vectors.

Many complex systems may be represented as graphs. These complex systems include social networks, communication networks, call graphs, biomedical graphs, consumer purchase activities, and the World Wide Web, to name a few. The graphs that represent these systems may be inherently combinatorial structures that are made of discrete parts, like nodes and edges plus associated attributes. However, because of their non-Euclidean nature, graphs do not present familiar features that are common to other systems, like a coordinate or vector space. It may be challenging to deal with graph data since, besides the graph theory, only a specific subset of statistical methods and machine learning models can be directly applied to graphs.

In light of these challenges, graph embedding algorithms may be used to transform graphs from their non-Euclidean space into low dimensional vectors in Euclidean space. Graph information, such as structural information about the graph, may be implicitly preserved in the graph embedding vectors. After a graph has been transformed to its corresponding graph embedding vectors, graph analytic tasks, such as node classification, community detection, link prediction/recommendation, and visualization can be conducted efficiently in both time and space. These analytic tasks may be used solve real world problems, such as binary similarity detection, malware detection, intrusion detection, fraud detection, bot detection, etc.

A variety of third parties offer services that allow graph embedding vectors to be uploaded, visualized, and explored. For example, Embedding Projector® offers a free service to visualize graph embeddings so that the users can upload their vectors and interactively explore the results. However, because graph embedding vectors may implicitly preserve graph information, it is important to understand the security and privacy implications when using third-party services to analyze graph embedding vectors. For example, a malicious third-party in possession of an original graph could perform a number of different attacks using data contained in the original graph, such as re-identifying individuals, structural data de-anonymization, link deanonymization, group membership inference, or node attribute de-anonymization.

Some embodiments disclosed herein may protect sensitive data from being exposed in graph embedding vectors. In particular, in some embodiments, sensitive data may be identified, and an original graph may be created from the sensitive data. The original graph may include a plurality of original nodes and original edges connecting the original nodes. First graph embedding vectors may be generated from the original graph. The first graph embedding vectors may include one or more attributes of the original nodes. A proxy graph may then be generated from the first graph embedding vectors. The proxy graph may include a plurality of proxy nodes and proxy edges connecting the proxy nodes. The proxy nodes may include the one or more attributes of the original nodes that are included in the first graph embedding vectors. Second graph embedding vectors may be generated by encoding the proxy graph and a reconstructed graph may be generated by decoding the second graph embedding vectors. The reconstructed graph may then be compared to the original graph to determine whether a threshold level of similarity is met. If this threshold level of similarity is met, a security action may be performed to protect the sensitive data from being exposed in the first graph embedding vectors. Therefore, some embodiments may protect sensitive data from being exposed in graph embedding vectors by protecting graph embedding vectors in which sensitive data may be exposed through reverse engineering.

Turning to the figures, FIG. 1 illustrates an example system 100 configured for protecting sensitive data from being exposed in graph embedding vectors. The system 100 may include a network 102, client devices 104a-104n, a security server 106, and a third-party server 108.

In some embodiments, the network 102 may be configured to communicatively couple the client devices 104a-104n, the security server 106, and the third-party server 108. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
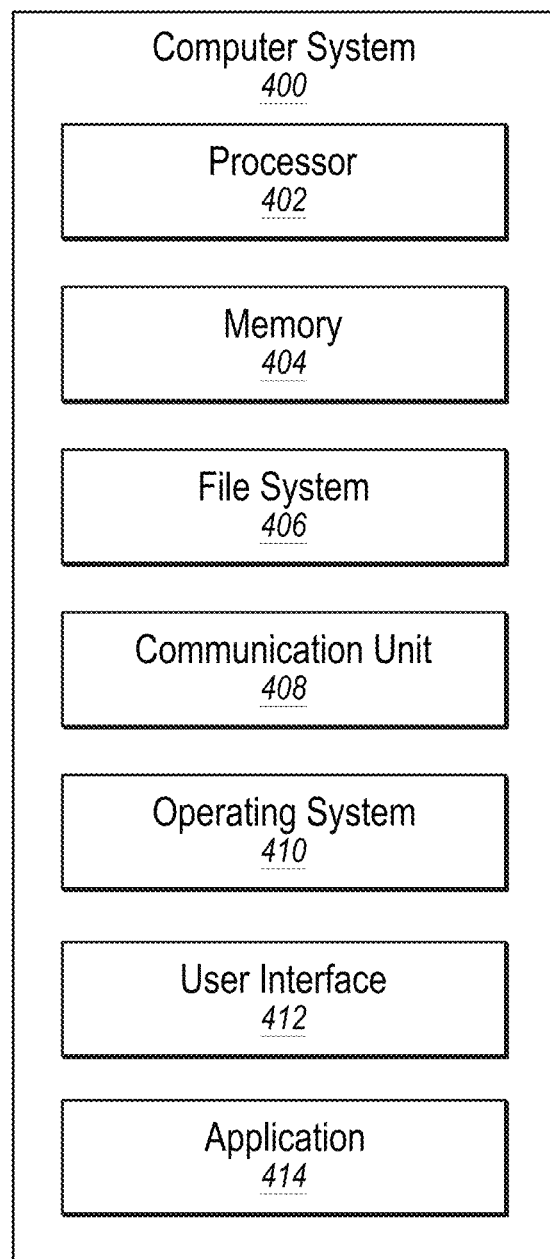
FIG. 4 illustrates an example computer system that may be employed to protect sensitive data from being exposed in graph embedding vectors.

In some embodiments, the client devices 104a-104n may be any computer systems capable of communicating over the network 102 and receiving sensitive data, examples of which are disclosed herein in connection with the computer system 400 of FIG. 4. The client devices 104a-104n may be associated with users 105a-105n. The client devices 104a-104n may include databases 110a-110n and data applications 112a-112n. The databases 110a-110n may store private, proprietary, or otherwise sensitive data. This sensitive data may include data received or otherwise collected from users 105a-105n. For example, sensitive data may include relationship information among individuals in a social network or other data related to users 105a-105n. Data applications 112a-112n may transmit this information to the security server 106 through the network 102.

In some embodiments, the security server 106 may be any computer system capable of communicating over the network 102 and capable of protecting sensitive data from being exposed in graph embedding vectors, examples of which are disclosed herein in connection with the computer system 400 of FIG. 4. The security server 106 may include a sensitive data database 114 where sensitive data may be stored. The sensitive data stored in sensitive data database 114 may include the data received from the client devices 104a-104n over the network 102.

In some embodiments, the security server 106 may include a security application 116. The security application 116 may perform a number of actions involving the data stored in the sensitive data database 114. For example, in some embodiments, the security application 116 may create an original graph 118. The original graph 118 may be created from sensitive data stored within the sensitive data database 114. The original graph 118 may a combinatorial structure that is made of a plurality of discrete nodes, edges, and associated node attributes. Nodes of original graph 118 may include attributes that relate to the original graph 118. The original graph 118 may have a non-Euclidean nature and lack features that are common to other systems, like a coordinate or vector space. Graphs, including the original graph 118, may represent any complex system, including social networks, communication networks, call graphs, biomedical graphs, consumer purchase activities, the World Wide Web, etc.

In some embodiments, the security application 116 may create first graph embedding vectors 120. The first graph embedding vectors 120 may be created from the original graph 118. For example, one or more graph embedding algorithms may be applied to the original graph 118 to create the first graph embedding vectors 120. The first graph embedding vectors 120 may include the number of edges of nodes of original graph 118 as well as the one or more attributes of the nodes of original graph 118. These attributes may be implicitly preserved as embeddings in the first graph embedding vectors 120. For example, the first graph embedding vectors 120 may include both the characteristics of each original node and the neighbor linkage structure of the original nodes in the original graph 118. These first graph embedding vectors 120 may be used for analytic tasks, such as node classification and community detection, link prediction/recommendation, and visualization.

In some embodiments, the security application 116 may create a proxy graph 122. The proxy graph 122 may be generated from the first graph embedding vectors 120. The proxy graph 122 may include both structural information as well as proxy node information. The structural information of the proxy graph 122 may include the location of proxy nodes and the proxy edges that connect the proxy nodes. A graph reconstruction method may be used to create the graphical representation of proxy nodes and the proxy edges that connect the proxy nodes. For example, in one embodiment, an c-neighborhood graph or a k-nearest neighbor (k-NN) graph reconstruction technique may be used. In other embodiments, a mutual k-NN graph reconstruction technique may be used. These reconstruction techniques may create a partially reconstructed original graph. The partially reconstructed graph may include some but not all of the edges connecting the original nodes in the original graph 118.

In addition to the structural information, which is contained in the graphical representation of the partially reconstructed graph, the proxy nodes may also include the embedding information from the first graph embedding vectors 120. The embeddings of the first graph embedding vectors 120 may be included within the proxy nodes as attributes.

In some embodiments, the security application 116 may create second graph embedding vectors 124. The second graph embedding vectors 124 may be generated by encoding the proxy graph 122, including both the structural information as well as the proxy node information. The encoding of the structural information as well as the proxy node information may be performed simultaneously. In some embodiments, a graph autoencoder may be used to generate the second graph embedding vectors 124 from the proxy graph 122. The graph autoencoder may be an unsupervised machine learning algorithm.

In some embodiments, the security application 116 may create a reconstructed graph 126. The reconstructed graph 126 may be generated by decoding the second graph embedding vectors 124. In some embodiments, the graph autoencoder used to create the second graph embedding vectors 124 may also be used to decode these vectors. For example, the graph autoencoder may first, using a graph neural network, project the proxy nodes into an embedding space. A decoder may then reconstruct the graph using the vectors from the embedding space. In some embodiments, the graph autoencoder may learn efficient data codings by compressing the proxy graph 122 data into a latent space (encoder) and then learning to reconstruct the data from the latent form (decoder). This process may be similar to dimensionality reduction techniques, such as Principal Component Analysis (PCA), but using a non-linear transformation.

In some embodiments, the security server 106 may include a threshold 128. The threshold 128 may be a predetermined level of similarity between two graphs. For example, the security application 116 may compare the reconstructed graph 126 to the original graph 118 to determine whether the predetermined level of similarity specified by the threshold 128 is met. In order to identify and quantify the structural similarity between the original graph 118 and the reconstructed graph 126, a network distance metric may be used. For example, a degree divergence metric, a communicability sequence entropy, an adjacency spectral distance or another network distance metric may be used.

If the level of similarity between the reconstructed graph 126 and the original graph 118 meets or exceeds the threshold 128, a security action may be performed. In some embodiments, the security action may be to advise against, or prevent, the sharing of first graph embedding vectors 120 with the third-party server 108. In other embodiments, the dimensions of the first graph embedding vectors 120 may be reduced before the first graph embedding vectors 120 are shared with third-party server 108. Lowering the dimensions of the first graph embedding vectors 120 however may reduce the descriptive power of these vectors, thus limiting the utility of the vectors in analytic tasks. Direct perturbing of the graph structure, such as introducing graph k-anonymity, may be an alternative candidate for an effective security action. In addition, a security action may include injecting the first graph embedding vectors 120 with random noise. For example, this random noise may be a differential privacy noise. The security action may require the first graph embedding vectors to be injected with this noise before the first graph embedding vectors are shared with the third-party server 108.

In some embodiments, the third-party server 108 may be any computer system capable of communicating over the network 102 and capable of receiving and analyzing graph embedding vectors, examples of which are disclosed herein in connection with the computer system 400 of FIG. 4. The third-party server may include a tools application 130. The tools application 130 may perform analytic tasks on graph embedding vectors. For example, the third-party server 108 may receive first graph embedding vectors 120 if the security server 106 determines that the threshold 128 level of similarity is not met. Once received, the third-party server 108 may perform analytic tasks on the first graph embedding vectors 120, such as node classification and community detection, link prediction/recommendation, and visualization.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
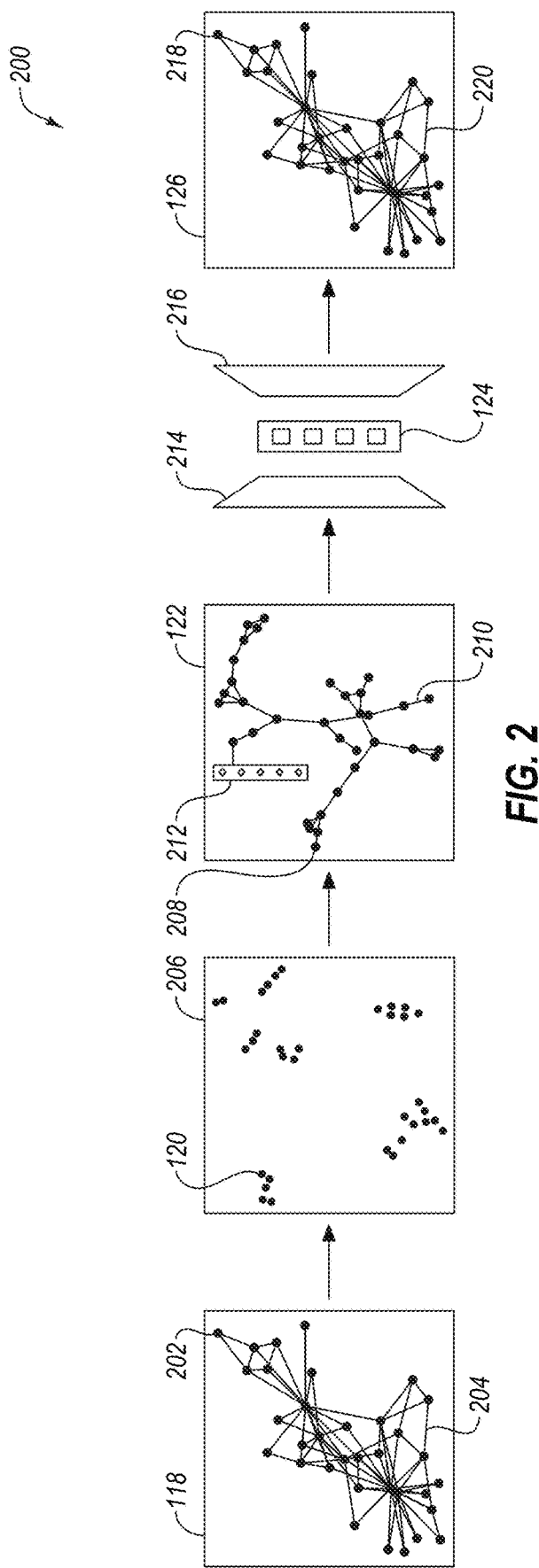
FIG. 2 illustrates an end-to-end workflow for protecting sensitive data from being exposed in graph embedding vectors.

FIG. 2 illustrates an end-to-end workflow 200 for protecting sensitive data from being exposed in graph embedding vectors. Workflow 200 includes, in a first stage, the original graph 118. Original graph 118 may include a plurality of original nodes 202 and a plurality of original edges 204, which connect the original nodes 202. The original nodes 202 may include attributes that relate to the original graph 118.

Workflow 200 also includes, at a second stage, a graph embedding 206. The graph embedding 206 may include the first graph embedding vectors 120. The first graph embedding vectors 120 may be created from the original graph 118 by applying a graph embedding algorithm to the original graph 118. The first graph embedding vectors 120 may include the number of original edges 204 of the original nodes 202. In addition, the first graph embedding vectors may implicitly preserve the one or more attributes of the original nodes 202.

Workflow 200 also includes, at a third stage, the proxy graph 122. Proxy graph 122 may be generated by applying a graph reconstruction technique to the graph embedding 206. For example, a nearest neighbor graph reconstruction technique may be applied to the graph embedding 206 or to the first graph embedding vectors 120 to create the proxy graph 122. Proxy graph 122 may include a plurality of proxy nodes 208, which may be positioned within the proxy graph 122 based on information contained within the first graph embedding vectors 120. The proxy nodes 208 may be connected by proxy edges 210. The proxy nodes 208 may also include proxy node attributes 212. The information contained within the proxy node attributes 212 may include the attributes of original nodes 202.

Workflow 200 also includes, at a fourth stage, an encoder 214 and a decoder 216. The encoder 214 may be used to encode the proxy graph 122 to create the second graph embedding vectors 124. The second graph embedding vectors 124 may then be decoded by decoder 216. In some embodiments, one or more of the positional information of the proxy nodes 208 within the proxy graph 122, including the proxy edges 210 and the proxy node attributes 212 may be used to create the second graph embedding vectors 124. In some embodiments, a graph autoencoder may be used to generate the second graph embedding vectors 124 from the proxy graph 122. The graph autoencoder may be an unsupervised machine learning algorithm. In some embodiments, the graph autoencoder used to encode the proxy graph 122 may also be used to decode the second graph embedding vectors 124.

Finally, workflow 200 includes, at a fifth stage, the reconstructed graph 126. In some embodiments, the decoder 216 may create the reconstructed graph 126 by decoding the second graph embedding vectors 124. The reconstructed graph 126 may include a plurality of reconstructed nodes 218, which are connected by reconstructed edges 220.

Reconstructed graph 126 may be compared to original graph 118 to determine whether the similarity between the reconstructed graph 126 and the original graph 118 meets or exceeds a threshold level of similarity. In order to identify and quantify the structural similarity between the original graph 118 and the reconstructed graph 126, a network distance metric may be used. For example, a degree divergence metric, a communicability sequence entropy, an adjacency spectral distance or another network distance metric may be used.

In some embodiments, if the level of similarity between the reconstructed graph 126 and the original graph 118 meets or exceeds the threshold, a security action may be taken. In one embodiment, the graph embedding 206 and the first graph embedding vectors 120 may be maintained private and not shared with any third parties if the level of similarity meets or exceeds the threshold. Maintaining private the first graph embedding vectors 120 when the threshold is met or exceeded will prevent third parties from using the first graph embedding vectors 120 to recreate the original graph 118 and discover sensitive data used to create original graph 118.

In alternative embodiments, the security action may include reducing the dimensions of the first graph embedding vectors 120 before the graph embedding 206 or the first graph embedding vectors 120 are shared with any third-party. Lowering the dimensions of the first graph embedding vectors 120 however may reduce the descriptive power of these vectors, thus limiting the utility of the vectors in analytic tasks. Direct perturbing of the graph structure, such as introducing graph k-anonymity, may be an alternative candidate for an effective security action. In addition, a security action may include injecting the graph embedding 206 or the first graph embedding vectors 120 with random noise. For example, this random noise may be a differential privacy noise.

Modifications, additions, or omissions may be made to the workflow 200 without departing from the scope of the present disclosure. For example, the workflow 200 may include additional stages that are similar to the stages illustrated in FIG. 2.

Figure 3:
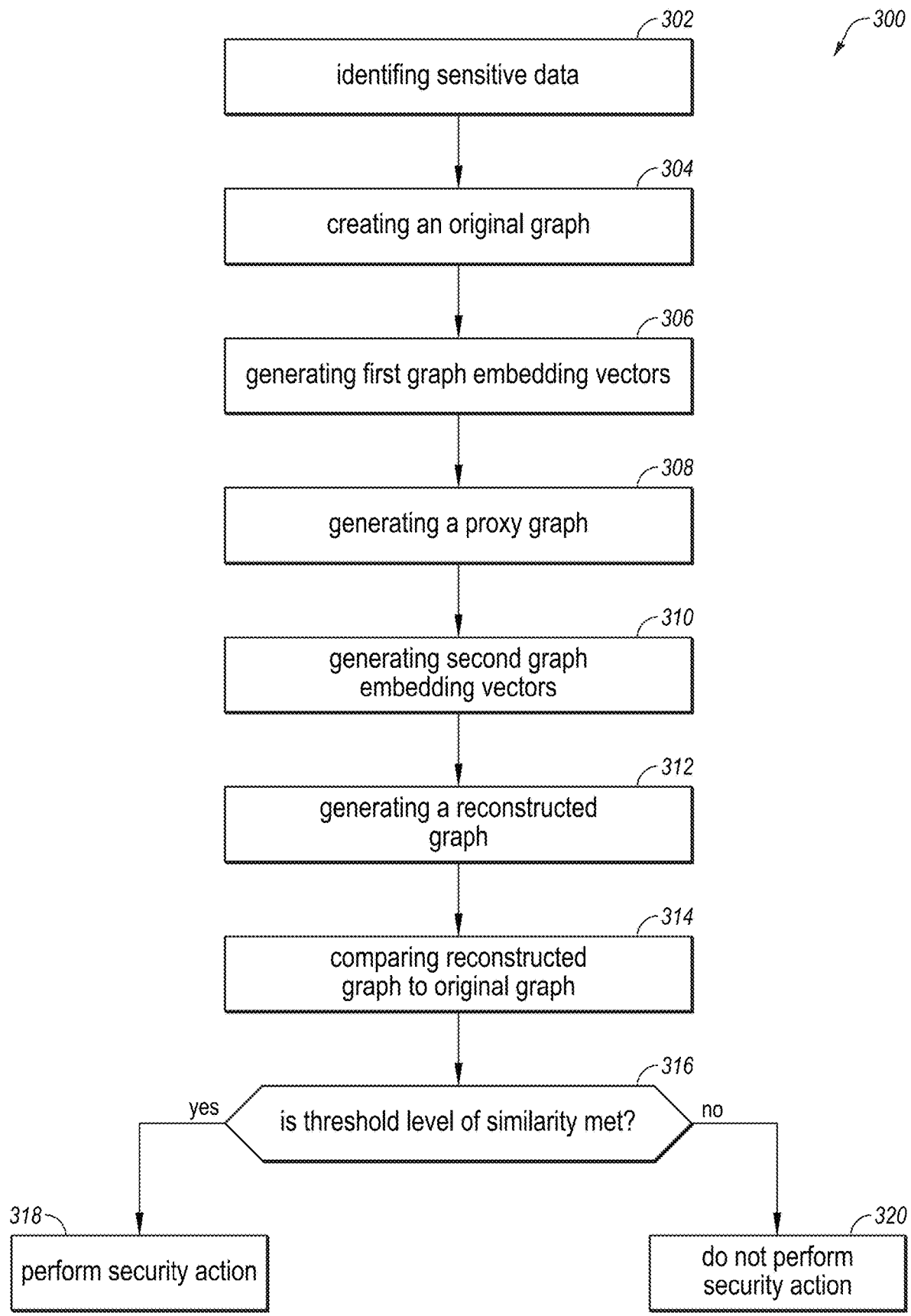
FIG. 3 is a flowchart of an example method for protecting sensitive data from being exposed in graph embedding vectors.

FIG. 3 is a flowchart of an example method 300 for protecting sensitive data from being exposed in graph embedding vectors. The method 300 may be performed, in some embodiments, by a device or system, such as by the security server 106 of FIG. 1. In these and other embodiments, the method 300 may be performed by one or more processors based on one or more computer-readable instructions stored on one or more non-transitory computer-readable media. The method 300 will now be described in connection with FIGS. 1-3.

The method 300 may include, at action 302, identifying sensitive data. In some embodiments, sensitive data may include data that is private or proprietary. For example, sensitive data may be gathered by local user devices, such as the client devices 104a-104n. The sensitive data may include personal information regarding the user of the local device. This sensitive data may be sent either directly or over a network to a server such as the security server 106 and/or to the security application 116.

The method 300 may include, at action 304, creating an original graph, such as the original graph 118. For example, the security application 116 may create the original graph 118 based on the sensitive data. The original graph 118 may be created in a non-Euclidean space. The original graph 118 may include a plurality of original nodes 202 and original edges 204 connecting the original nodes 202. The original nodes 202 may include attributes that relate to the original graph 118.

The method 300 may include, at action 306, generating first graph embedding vectors. For example, the security application 116 may generate the first graph embedding vectors 120 based on the original graph 118. The first graph embedding vectors 120 may be generated within a graph embedding using one or more graph embedding algorithms. The first graph embedding vectors 120 may include the number of edges 204 of the original nodes 202 as well as the one or more attributes of the original nodes 202. These attributes may be implicitly preserved in the first graph embedding vectors 120.

The method 300 may include, at action 308, generating a proxy graph. For example, the security application 116 may generate the proxy graph 122 based on the first graph embedding vectors 120. A graph reconstruction method may be used to generate the proxy graph 122. For example, a nearest neighbor graph reconstruction method may be used to generate the proxy graph 122. The proxy graph 122 may represent a partially reconstructed original graph. The proxy graph 122 may include a plurality of proxy nodes 208 and proxy edges 210. The proxy nodes 208 may contain attributes that include the attributes of the original nodes 202.

The method 300 may include, at action 310, generating second graph embedding vectors 124. For example, to generate the second graph embedding vectors 124, the security application 116 may encode the proxy graph 122. In some embodiments, the information contained within the proxy nodes 208 as well as the proxy edges 210 may be used to generate the second graph embedding vectors 124. This information may be encoded simultaneously to create the second graph embedding vectors 124. In some embodiments, a graph autoencoder may be used to generate the second graph embedding vectors 124 from the proxy graph 122. The graph autoencoder may include an unsupervised machine learning algorithm.

The method 300 may include, at action 312, generating a reconstructed graph. For example, the security application 116 may generate the reconstructed graph 126 by decoding the second graph embedding vectors 124. In some embodiments, the graph autoencoder used to encode the proxy graph 122 may also be used to decode the second graph embedding vectors 124. The reconstructed graph 126 may include a plurality of reconstructed nodes 218 and reconstructed edges 220 connecting the reconstructed nodes.

The method 300 may include, at action 314, comparing the reconstructed graph to the original graph. For example, in order to perform this comparison and quantify the structural similarity between the original graph 118 and the reconstructed graph 126, a network distance metric may be used. For example, a degree divergence metric, a communicability sequence entropy, an adjacency spectral distance or another network distance metric may be used.

The method 300 may include, at action 316, determining whether a threshold level of similarity between the original graph and the reconstructed graph is met. This threshold level of similarity may be a predetermined level. If the threshold level of similarity is met, a security action may be performed at step 318. For example, this security action may include preventing the first graph embedding vectors 120 from being shared with any third parties, such as the third-party server 108. In other embodiments, the dimensions of the first graph embedding vectors 120 may be reduced before the first graph embedding vectors 120 are shared with any third-party. In addition, a security action may include injecting the first graph embedding vectors 120 with random noise. For example, this random noise may be a differential privacy noise.

If the threshold level of similarity is not met, performance of the security action may be avoided at step 320. In some embodiments, the first graph embedding vectors 120 may be approved for sharing with third parties if the threshold level of similarity is not met.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 310 and 312 may be performed as a single action. For example, a graph autoencoder may be used to encode the proxy graph and generate the second graph embedding vectors and also decode the second graph embedding vectors to generate the reconstructed graph. These actions may be performed by the graph autoencoder as a single step.

Also, the method 300 may improve the technical field of protecting sensitive data that is contained in graph embedding vectors. By evaluating graph embedding vectors to determine whether an original graph can be reconstructed, data owners can perform a security function in the event that an original graph can be created from the graph embedding vectors. This security function can ensure that no sensitive data is disclosed to any third party.

FIG. 4 illustrates an example computer system 400 that may be employed to protect sensitive data from being exposed in graph embedding vectors. In some embodiments, the computer system 400 may be part of any of the systems or devices described in this disclosure. For example, the computer system 400 may be part of any of the client devices 104a-104n, the security server 106, and the third-party server 108 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the data application 112a-112n, or the security application 116, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the data application 112a-112n and the security application 116 in FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting sensitive data from being exposed in graph embedding vectors, at least a portion of the method being performed by a computing device comprising one or more processors, the computer-implemented method comprising:
    identifying sensitive data;
    creating an original graph from the sensitive data, the original graph including a plurality of original nodes and original edges connecting the original nodes;
    generating first graph embedding vectors from the original graph, the first graph embedding vectors including one or more attributes of the original nodes;
    generating from the first graph embedding vectors a proxy graph, the proxy graph including a plurality of proxy nodes and proxy edges connecting the proxy nodes, the proxy nodes including the one or more attributes of the original nodes included in the first graph embedding vectors;
    generating second graph embedding vectors by encoding the proxy graph;
    generating a reconstructed graph by decoding the second graph embedding vectors;
    comparing the reconstructed graph to the original graph to determine whether a threshold level of similarity is met; and
    in response to determining that the threshold level of similarity is met, performing a security action to protect the sensitive data from being exposed to a third-party through the first graph embedding vectors.

2. The computer-implemented method of claim 1, wherein the first graph embedding vectors are generated by applying a graph embedding algorithm to the original graph.

3. The computer-implemented method of claim 1, wherein the proxy graph is generated by using a mutual k-NN graph construction technique.

4. The computer-implemented method of claim 1, wherein the generating of the second graph embedding vectors comprises using a graph autoencoder.

5. The computer-implemented method of claim 4, wherein the graph autoencoder comprises an unsupervised machine learning algorithm.

6. The computer-implemented method of claim 1, wherein the performing of the security action comprises injecting the first graph embedding vectors with random noise prior to sharing the first graph embedding vectors with the third-party.

7. One or more non-transitory computer-readable media comprising one or more computer-readable instructions that, when executed by one or more processors of a security server, cause the security server to perform a method for protecting sensitive data from being exposed in graph embedding vectors, the method comprising:
    identifying sensitive data;
    creating an original graph from the sensitive data, the original graph including a plurality of original nodes and original edges connecting the original nodes;
    generating first graph embedding vectors from the original graph, the first graph embedding vectors including one or more attributes of the original nodes;
    generating from the first graph embedding vectors a proxy graph, the proxy graph including a plurality of proxy nodes and proxy edges connecting the proxy nodes, the proxy nodes including the one or more attributes of the original nodes included in the first graph embedding vectors;
    generating second graph embedding vectors by encoding the proxy graph;
    generating a reconstructed graph by decoding the second graph embedding vectors;
    comparing the reconstructed graph to the original graph to determine whether a threshold level of similarity is met; and
    in response to determining that the threshold level of similarity is met, performing a security action to protect the sensitive data from being exposed to a third-party through the first graph embedding vectors.

8. The one or more non-transitory computer-readable media of claim 7, wherein the first graph embedding vectors are generated by applying a graph embedding algorithm to the original graph.

9. The one or more non-transitory computer-readable media of claim 7, wherein the proxy graph is generated by using a mutual k-NN graph construction technique.

10. The one or more non-transitory computer-readable media of claim 7, wherein the generating of the second graph embedding vectors comprises using a graph autoencoder.

11. The one or more non-transitory computer-readable media of claim 10, wherein the graph autoencoder comprises an unsupervised machine learning algorithm.

12. The one or more non-transitory computer-readable media of claim 7, wherein the performing of the security action comprises injecting the first graph embedding vectors with random noise prior to sharing the first graph embedding vectors with the third-party.

13. A computing device comprising:
    one or more processors; and
    one or more non-transitory computer-readable media comprising one or more computer-readable instructions that, when executed by the one or more processors, cause the computing device to perform a method for protecting sensitive data from being exposed in graph embedding vectors, the method comprising:
    identifying sensitive data;
    creating an original graph from the sensitive data, the original graph including a plurality of original nodes and original edges connecting the original nodes;
    generating first graph embedding vectors from the original graph, the first graph embedding vectors including one or more attributes of the original nodes;
    generating from the first graph embedding vectors a proxy graph, the proxy graph including a plurality of proxy nodes and proxy edges connecting the proxy nodes, the proxy nodes including the one or more attributes of the original nodes included in the first graph embedding vectors;

generating second graph embedding vectors by encoding the proxy graph;

generating a reconstructed graph by decoding the second graph embedding vectors;

comparing the reconstructed graph to the original graph to determine whether a threshold level of similarity is met; and in response to determining that the threshold level of similarity is met, performing a security action to protect the sensitive data from being exposed to a third-party through the first graph embedding vectors.

14. The computing device of claim 13, wherein the proxy graph is generated by using a mutual k-NN graph construction technique.

15. The computing device of claim 13, wherein the generating of the second graph embedding vectors comprises using a graph autoencoder.

16. The computing device of claim 15, wherein the graph autoencoder comprises an unsupervised machine learning algorithm.

17. The computing device of claim 13, wherein the performing of the security action comprises injecting the first graph embedding vectors with random noise.

* * * * *